Feb. 3, 1970  H. G. KOSMAHL  3,493,797
LINEAR MAGNETIC BRAKE WITH TWO WINDINGS
Filed Dec. 12, 1966
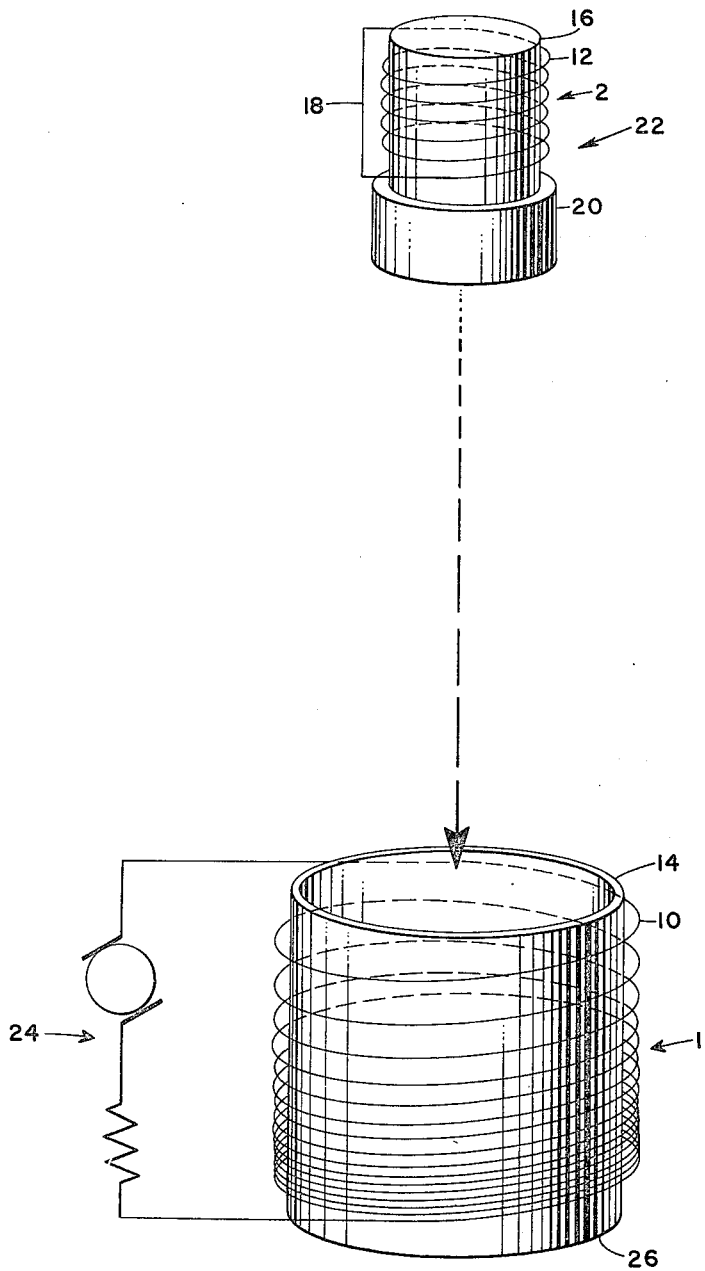
INVENTORS
HEINRICH G. KOSMAHL
BY
ATTORNEYS

United States Patent Office 3,493,797
Patented Feb. 3, 1970

3,493,797
LINEAR MAGNETIC BRAKE WITH TWO WINDINGS
Heinrich G. Kosmahl, Olmsted Falls, Ohio, assignor to the United States of America as represented by the Administrator of the National Aeronautics and Space Administration
Filed Dec. 12, 1966, Ser. No. 601,228
Int. Cl. H02k 49/00
U.S. Cl. 310—93                            8 Claims

ABSTRACT OF THE DISCLOSURE

Linear magnetic braking using a pair of inductively coupled circuits. A primary coil is nonuniformly wrapped about a tubular core with a winding density which produces a constant force on a secondary coil.

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention is concerned with the controlled deceleration of a moving mass. The invention is particularly directed to an improved magnetic brake system for stopping a falling body.

A controlled stopping of a falling mass presents some difficult braking problems. In many applications the rate of deceleration must not exceed a very low maximum to avoid damage to the payload. Also, the amount of energy which can be expended in decelerating the object should be kept to a minimum.

These problems encountered in decelerating a moving body have been solved by a magnetic brake system constructed in accordance with the present invention. The mechanism of operation of this system is based on Lenz's law which states that magnetic fields induced in one circuit as a result of interaction with another circuit oppose each other. This system relies on the mutual inductance between two magnetically coupled and unconventionally wound circuits spaced from one another. One of these circuits has a primary magnetic coil whose configuration is such that the motion of a secondary magnetic coil through the fields of the primary coil is brought to a stop under controlled conditions requiring minimum primary energy.

It is, therefore, an object of the present invention to provide a magnetic brake system which will bring a known mass to a full stop with a minimum expenditure of energy.

A further object of the invention is to provide a magnetic brake system in which the braking action is accomplished in a precisely adjustable manner with respect to the desired degree of deceleration by simply varying the voltage and current of a primary circuit.

These and other objects of the invention will be apparent from the specification which follows and from the drawing in which like numerals are used throughout to identify like parts.

The drawing is a schematic illustration of a magnetic braking system constructed in accordance with the present invention.

Referring now to the drawing, the braking system utilizes a pair of magnetic coils 1 and 2. The primary coil 1 is fixed in a desired position, such as at the bottom of a drop tower in a zero gravity research facility. The secondary coil 2 forms a part of a movable structure, such as a drop tower experiment capsule.

The coil 1 comprises a conductor 10 having a large diameter $d_1$ which is wrapped about a hollow tubular core 14 as shown in the drawing. The coil 1 has one of several configurations which will be described later in greater detail. The coil 2 likewise comprises a large diameter conductor 12 which is uniformly wrapped about a cylindrical core 16, and the ends of the conductor 12 are short circuited by a line 18.

A payload 20 is rigidly mounted on one end of the coil 2 and is preferably magnetically noninteractive. The coil 2, core 16 and payload 20 comprise a test package 22 which is free to fall towards the fixed primary coil 1 in the direction of the arrow shown in the drawing. The path of movement of this test package 22 is along the axis of the tubular core 14.

The interaction of the two coils 1 and 2 can best be described by their mutual inductance M in henries. The primary coil 1 is connected to a power source 24 which provides a load voltage $V_0$ in volts and has an impedance $R_g$ in ohms which is much smaller than the impedance $R_1$ of the coil 1. The bottom end 26 of the coil 1 away from the coil 2 represents the origin of a coordinate system in which the axial coordinate is $z$. The test package 22 moves only in the $z$ direction.

The payload 20 has a given mass $m_0$ while the coil 2 together with its core 16 have a mass $m_2$. The total mass $m$ in kilograms of the test package 22 is $m_0 + m_2$.

Prior to any interaction between the primary coil 1 and secondary coil 2 a steady-state current $i_{1,0}$ from the power source 24 flows in the conductor 10. As the test package 22 moves in the $z$ direction its momentary distance from the bottom end 26 of the coil 1 is $z$. The instantaneous velocity $\dot{z}[z(t)1]$ of the coil 2, where $z$ is the first derivative, is determined from the following equations in which $L_1$ is the self inductance in henries of the coil 1 and $i_2$ is the current flow in the second coil 2 in kiloamperes.

$$V_0 = i_1(t)R_1 + L_1\frac{di_1}{dt} + \frac{dM(z)}{dt}i_2 + M(z)\frac{di_2}{dt} \quad (1)$$

$$0 = i_2(t)R_2 + L_2\frac{di_2}{dt} + \frac{dM(z)}{dt}i_1(t) + M(z)\frac{di_1(t)}{dt} \quad (2)$$

The repelling magnetic force $F_m$ acting upon the turns 12 of the falling payload is $$F_m = i_1(t)i_2(t)\frac{dM(z)}{dz} \quad (3)$$

where $z$ is the distance between defined points in coils 1 and 2. In the following equation of motion of the payload $\ddot{z}$ is the second derivative and the value of $g$ is 9.81 meters per second per second.

$$\ddot{z} = g - \frac{i_1(t)i_2(t)}{m}\frac{dM(z)}{dz} \quad (4)$$

Multiplication by $\dot{z}$, the first derivative, and integration between $t=0$ and $t=t$ produces the following energy equation in which $h$ is the total distance in meters through which the test package 22 as fallen.

$$\dot{z}^2(t) = 2g[h - z(t)] - \frac{2}{m}\int_{t=0}^{t=t}i_1(t)\cdot i_2(t)\frac{dM(z)}{dz}\dot{z}(t)dt \quad (5)$$

since $\dot{z}(0)$, the velocity at $z=h$, is zero.

The initial value conditions are $i_1(0)=i_0$ and $i_2=0$. After $M=M(z)$ has been computed, Equations 1, 2 and 5 are solved simultaneously for $z(t)$ and $\dot{z}(t)$. The values $\dot{z}(t_s)=0$ and $z(t_s)$ give the stopping time $t_s$ and stopping position $z(t_s)=x_s$ of the payload above the ground level.

It is evident from these equations that the stopping characteristics can be altered by changing the configuration of the winding of the coil 1. Various parameters for three such configurations are shown in Tables 1 and 2.

These tables list the lengths $l_1$ and $l_2$ in meters of the coils 1 and 2, respectively. The diameter $d_2$ of the conductor 12 in the coil 2 is given in meters along with its specific resistivity $\rho_2$ in ohms meter.

As stated above the conductor 12 of the coil 2 is uniformly wrapped, and the tables list the winding density $w$ of this coil in turns per meter. Two separate values in meters for the radius $b$ of the secondary coil 2 are also shown.

in Table 2 are for a system having a primary coil with a winding density of $2(l+5 \cos \pi z/l_1)$. The last four values in Table 2 are for a system having a primary coil with a winding density of $$2\left[l+5\left(l-\frac{2z}{l_1}\right)\right]$$

In deciding which configuration is preferable over the others for a particular application the primary power must not be the sole criterion because of the presence of retraining conditions and ease of construction. Two important conditions in drop tower applications are the

TABLE 1

| | $d_2$, m | $\sigma_2$, ($\Omega$) (m) | $w$, turns/m | $b$, m | $l_2$, m | $V_1$, V | $i_{1,0}$ kA | $G_{max}$, g | $x_s$, m | $P$, MW | $\tau_1$, sec. |
|---|---|---|---|---|---|---|---|---|---|---|---|
| $l_1$, m: | | | | | | | | | | | |
| 8 | 0.05 | 3.0×10³ | 6 | 1.00 | 0.6 | 107 | 123.8 | 29.8 | 0.65 | 13.2 | 2.3 |
| 8 | .10 | 3.0 | 6 | 1.00 | 0.6 | 98 | 113.4 | 30.2 | 1.96 | 11.1 | 2.3 |
| 8 | .10 | .6 | 6 | 1.00 | 0.6 | 91 | 105.3 | 30.3 | 1.87 | 9.6 | 2.3 |
| 8 | .05 | .6 | 6 | .75 | 0.6 | 124 | 144.0 | 30.2 | 2.20 | 17.8 | 2.3 |
| 8 | .10 | 3.0 | 6 | .75 | 0.6 | 141 | 163.2 | 29.6 | 2.10 | 23.0 | 2.3 |
| 8 | .10 | 3.0 | 6 | .75 | .7 | 138 | 159.7 | 29.5 | 1.93 | 22.0 | 2.3 |
| 8 | .05 | 3.0 | 6 | .75 | .8 | 146 | 169.0 | 29.7 | .06 | 24.7 | 2.3 |
| 8 | .10 | 3.0 | 6 | .75 | .8 | 135 | 156.0 | 29.8 | .10 | 21.1 | 2.3 |
| 8 | .10 | 3.0 | 6 | .75 | 1.0 | 131 | 151.0 | 29.8 | 1.90 | 19.9 | 2.3 |
| 8 | .10 | 3.0 | 6 | .75 | 1.2 | 128 | 148.2 | 30.0 | 1.95 | 19.0 | 2.3 |
| 8 | .10 | 3.0 | 6 | .75 | 1.6 | 125 | 144.7 | 31.0 | 2.20 | 18.1 | 2.3 |
| 12 | .05 | .6 | 6 | .75 | .6 | 170 | 131.0 | 19.2 | 1.2 | 22.4 | 3.55 |
| 12 | .05 | 3.0 | 6 | .75 | .6 | 237 | 183.0 | 19.8 | .85 | 43.3 | 3.55 |
| 8 | .10 | 3.0 | 2 | .75 | 1.2 | 123 | 142.0 | 29.5 | 1.80 | 17.5 | 2.3 |
| 8 | .10 | 3.0 | 4 | .75 | 1.2 | 122 | 141.0 | 29.6 | 1.90 | 17.2 | 2.3 |
| 8 | .10 | 3.0 | 6 | .75 | 1.2 | 128 | 148.0 | 29.8 | 1.95 | 18.9 | 2.3 |
| 8 | .10 | 3.0 | 8 | .75 | 1.2 | 135 | 156.0 | 30.2 | 2.10 | 21.1 | 2.3 |

TABLE 2

| | $d_2$, m | $\sigma_2$, ($\Omega$) (m) | $w$, turns/m | $b$, m | $l_2$, m | $V_1$, V | $i_{1,0}$ kA | $G_{max}$, g | $x_s$, m | $P$, MW | $\tau_1$, sec. |
|---|---|---|---|---|---|---|---|---|---|---|---|
| $l_1$, m: | | | | | | | | | | | |
| 8 | 0.05 | 0.6×10 | 6 | 0.75 | 0.6 | 134 | 93.0 | 39.0 | 4.5 | 12.5 | 3.46 |
| 8 | .05 | 3.0 | 6 | 0.75 | 0.6 | 170 | 119.0 | 44.1 | 5.0 | 20.0 | 3.46 |
| 8 | .10 | .6 | 6 | 0.75 | 0.6 | 149 | 103.0 | 41.3 | 4.9 | 15.5 | 3.46 |
| 12 | .05 | .6 | 6 | 0.75 | 0.6 | 191 | 88.0 | 27.0 | 7.0 | 16.8 | 3.65 |
| 12 | .05 | 3.0 | 6 | 0.75 | 0.6 | 257 | 119.0 | 32.0 | 7.8 | 30.6 | 3.65 |
| 12 | .10 | .6 | 6 | 0.75 | 0.6 | 201 | 93.0 | 26.0 | 6.7 | 18.7 | 3.65 |
| 12 | 0.05 | 0.6×10 | 6 | 0.75 | 0.6 | 175 | 96.4 | 27.6 | 6.9 | 16.9 | 3.22 |
| 12 | .1 | .6 | 6 | .75 | .6 | 185 | 102.0 | 27.7 | 6.8 | 18.9 | 3.22 |
| 12 | .05 | 3.0 | 6 | .75 | .6 | 232 | 127.6 | 29.6 | 7.6 | 29.6 | 3.22 |
| 12 | .1 | 3.0 | 6 | .75 | .6 | 201 | 110.5 | 27.3 | 6.9 | 22.2 | 3.22 |

In addition to the aforementioned geometrical parameters these two tables contain the primary coil voltage $V_1$, the steady-state primary current $i_{1,0}$ at the beginning of interaction, the power P, the normalized force G in multiples of $g_0$, and the position $x_s$ at which the center of the payload turns approaches zero velocity, measured from the bottom end 26 of the primary coil where $z=0$.

The decelerating force persists even after $z$ has reached zero because the time constant $\tau_2 = L_2/R_2$ of the secondary coil 2 prevents an instantaneous decay of $i_2$ to zero. Therefore, the repelling magnetic force $F_m$ remains finite over a period of a few constants, and a perfect stop is possible.

Also listed in Tables 1 and 2 are two values of the specific resistivity $\rho_2$ for aluminum which are $$3 \times 10^{-8} (\Omega)(m)$$

at room temperature $T=300°$ K and $0.6 \times 10^{-8}(\Omega)(m)$ at $T=80°$ K. The primary current $i_1$ is not absolutely constant; however, because of the relatively large time constant $\tau_1$, the current $i_1$ changes by less than ten percent of the initial $i_{1,0}$ value.

The parameters shown in Tables 1 and 2 are applicable to a payload 20 having a mass $m_0$ of 900 kilograms to which the mass of an aluminum conductor 12 has been added. The diameter of the primary coil is three meters. The primary turns consist of 0.1 meter diameter copper wire 10 having a specific resistivity $\rho_1$ of $1.8 \times 10^{-8}$ ohms meter.

Parameters for three different winding configurations of the primary coil 1 are set out in Tables 1 and 2. The primary coil 1 of the system described in Table 1 has a winding density of $10(l-z/l_1)$. The first six values listed time constant $\tau_1$ be as small as possible where the magnetic field is unconstrained in order for the current $i_1$ to build up as close to its final value $i_{1,0}$ as possible in a time $t$ which is less than or equal to approximately twice the free fall time through a height $h$. By way of example, where $h=120$ meters the time $t=10$ seconds is the maximum period available for the build up of current in case of a two-way up-and-down experiment.

Other conditions for experiments conducted in the above drop tower are that the upper limit of deceleration G is smaller than 30 $g$'s. The power requirements to bring the payload 22 to a full stop can be reduced substantially if the condition G is equal to or less than 30 is disregarded because stopping action can be accomplished with a shorter primary coil.

A study of Tables 1 and 2 indicates that the application of cryogenic cooling to the secondary turns reduces substantially the primary power requirements in the case of $d_2=0.05$ meter and only slightly in the case of $d_2=0.1$ meter. Also, the primary power requirement decreases rapidly as the secondary coil radius is increased from 0.75 to 1.0 meter and the primary coil radius is 1.5 meters.

For equal values of specific resistivity, conductor diameter, coil length, winding density, and coil radius of the secondary coil 2 while keeping G equal to or less than 30 the power requirements of the three tabulated winding configurations necessary to bring about a full stop are approximately the same. However, the energy requirements are not equal.

The primary coil configuration having a winding density $w_1=$ constant $x[l-(z/l)]$ produces the shortest time constant $\tau_1=2.3$ seconds. This configuration also requires the smallest number of turns to bring about a full stop of the payload.

The meaning of the term full stop refers to a motion in which the velocity decays directly to zero without oscillations in the sign of the deceleration. That is, there is no acceleration. The position of the stop in all symmetrically wound coils lies above the coil center where $z=l_1/2$. This occurs because in symmetric coils the mutual inductance M has a maximum and $$\frac{dM}{dz}=0$$

at the center of the coil. Thus $dM/dz$ reverses its sign in going through the center. In the expression for the repelling force $F_m$ set forth above in Equation 3, $i_1(t)$ remains almost constant and the sign of $i_2$ depends primarily on that of $dM/dz$. Because the time constant $\tau_2$ is rarely below 0.1 second a reversal in the sign of $dM/dz$ in going through the center would preclude that occurring in $i_2$.

Therefore, if the payload 20 moves over the center, a short period of acceleration will follow: the payload velocity would increase temporarily before final deceleration could occur to cause the final stop. This two phase deceleration with a short acceleration period in between produces a workable mode of operation requiring approximately 10 percent less power than one phase stopping.

The effect of changing $l_2$ on the power requirement indicates an optimum length $l_2$ is less than $l_1$. This is because two competing factors produce a minimum power requirement. More particularly, increasing $l_2$ increases the flux through the secondary coil which increases the braking force. However, the mass $m_2$ increases proportionally with $l_2$ and reduced the effect of the decelerating force in front of the integral in Equation 5.

A clear dip in power requirements occurs when the winding density of the secondary coil $w_2$ is changed as shown in Table 1. This optimum occurs because of the competing effects between the secondary time constant $\tau_2$ which prevents a rapid build-up of $i_2$ and the mutual inductance $M_{1,2}$. Because both $\tau_2$ as well as $M_{1,2}$ increase with increasing $w_2$, a minimum in the required power occurs if the total interaction time is not substantially larger than $\tau_2$.

Although several embodiments of a braking system constructed in accordance with the invention have been described, it will be appreciated that various structural modifications may be made without departing from the spirit of the invention or the scope of the subjoined claims. For example, the payload 20 in the system described is magnetically noninteractive. However, it is contemplated that certain installations may have payloads that are magnetically interactive with the primary coil. It is further contemplated that the magnetic field may be constrained to the inside of the tubular core by placing a magnetically conducting membrane perpendicular to its axis. With such a modification the time constant $\tau_1$ is of little importance, and the field can be built up prior to the ejection of the payload.

What is claimed is:

1. Apparatus for stopping a freely falling body with a minimum expenditure of electrical energy and a predetermined amount of deceleration comprising
    a tubular core being rigidly mounted in the path of the freely falling body and having a diameter greater than said body to enable the same to enter said core,
    a first constant diameter conductor forming a single primary coil wrapped about said tubular core,
    a power supply connected to said primary coil for passing a predetermined current through said primary coil to create a first magnetic field therein,
    a cylindrical core mounted on the freely falling body,
    a second constant diameter conductor forming a secondary coil wrapped about said cylindrical core, and
    means for short circuiting the ends of said secondary coil to enable an induced current to flow therein as said secondary coil moves through the magnetic field of said primary coil thereby creating a second magnetic field in opposition to said first magnetic field,
    said primary coil being nonuniformly wrapped with a winding which produces a constant force.

2. Apparatus as claimed in claim 1 wheren the primary coil has a winding density of K $(l-z/l)$ where K is a constant, z is the distance from one end of the coil and $l$ is the length of the coil.

3. Apparatus as claimed in claim 1 wherein the deceleration is smaller than 30 $g$'s and the primary coil has a winding density of 10 $(l-z/l)$ where z is the distance from one end of the coil and $l$ is the length of the coil.

4. Apparatus as claimed in claim 1 wherein the secondary coil is uniformly wrapped about the cylindrical core.

5. Apparatus as claimed in claim 1 wherein the primary coil is mounted at the bottom of a drop tower in a zero gravity research facility, and the moving body comprises a drop tower experiment capsule.

6. Apparatus as claimed in claim 5 wherein the drop tower experiment capsule is free to fall toward the primary coil from a predetermined height.

7. Apparatus as claimed in claim 5 wherein the drop tower experiment capsule includes the secondary coil, the cylindrical core within said secondary coil, and a payload rigidly mounted on one end of said core.

8. Apparatus as claimed in claim 7 wherein the payload is magnetically noninteractive.

References Cited

UNITED STATES PATENTS

| | | | |
|---|---|---|---|
| 1,873,122 | 8/1932 | Hartzell | 336—224 XR |
| 1,985,254 | 12/1934 | Huse | 310—13 |
| 1,989,205 | 1/1935 | Loughlin | 336—224 XR |
| 3,260,870 | 7/1966 | Beach | 310—14 |
| 3,300,744 | 1/1967 | Deutsch | 310—14 |

ORIS L. RADER, Primary Examiner

A. G. COLLINS, Assistant Examiner

U.S. Cl. X.R.

310—13